US008633970B1

(12) United States Patent
Mercay et al.

(10) Patent No.: US 8,633,970 B1
(45) Date of Patent: Jan. 21, 2014

(54) AUGMENTED REALITY WITH EARTH DATA (75) Inventors: Julien C. Mercay, Belmont, CA (US);
David Kornmann, Tucson, AZ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/599,755

(22) Filed: Aug. 30, 2012

(51) Int. Cl.
H04N 13/02 (2006.01)
H04N 15/00 (2006.01)
H04N 13/00 (2006.01)
G09G 5/00 (2006.01)

(52) U.S. Cl.
USPC ............................. 348/46; 348/43; 345/633

(58) Field of Classification Search
USPC .......................................................... 348/46
See application file for complete search history.

(56) References Cited

U.S. PATENT DOCUMENTS

2012/0194644 A1* 8/2012 Newcombe et al. ............ 348/46
2012/0200667 A1* 8/2012 Gay et al. ...................... 348/43
2012/0293550 A1* 11/2012 Lo et al. ........................ 345/633

OTHER PUBLICATIONS

Snavely, Noah, et al., "Modeling the World from Internet Photo Collections", International Journal of Computer Vision, Nov. 2008, pp. 189-210, vol. 80, Issue 2, Kluwer Academic Publishers, Hingham, MA.

Foxlin, E., et al., "FlightTracker: A Novel Optical/Inertial Tracker for Cockpit Enhanced Vision," Proceedings of the Third IEEE and ACM International Symposium on Mixed and Augmented Reality (ISMAR 2004), IEEE, United States (2004).

State, A., et al., "Superior Augmented Reality Registration by Integrating Landmark Tracking and Magnetic Tracking," SIGGRAPH '96 Proceedings of the 23rd annual conference on Computer graphics and interactive techniques, pp. 429-438, ACM, United States (1996).

State, A., et al., "Technologies for Augmented Reality Systems: Realizing Ultrasound-Guided Needle Biopsies,"SIGGRAPH '96 Proceedings of the 23rd annual conference on Computer graphics and interactive techniques, pp. 439-446, ACM, United States (1996).

* cited by examiner

Primary Examiner — Christopher S Kelley
Assistant Examiner — Hee-Yong Kim
(74) Attorney, Agent, or Firm — Sterne, Kessler, Goldstein & Fox P.L.L.C.

(57) ABSTRACT

Systems, methods and articles of manufacture for augmenting reality are described herein. An embodiment may include computing a real-world depth map using real-world imagery captured by an imaging device, providing, to a rendering engine, perspective information including location coordinates representing a location of the imaging device, rendering a computed depth map based on geographical data retrieved from a server in response to the providing, the geographical data corresponding to at least the location of the imaging device, correlating the real-world depth map with the computed depth map to improve accuracy of the location of the imaging device represented by the location coordinates, and overlaying the real-world imagery with virtual information based on the correlated real-world depth map and the computed depth map.

27 Claims, 10 Drawing Sheets

502 Determining a field of view and a corresponding focal point of the imaging device, the location of the focal point corresponding to the location co-ordinates provided by the imaging device

504 Aligning one or more points on horizon lines to exactly or substantially coincide with one or more points in edge information extracted from the real-world imagery, the alignment generating an updated location for the focal point, the updated location of the focal point corresponding to accurate location co-ordinates of the imaging device

AUGMENTED REALITY WITH EARTH DATA

BACKGROUND

1. Field

Embodiments generally relate to augmented reality.

2. Background Discussion

Augmented reality is a field of computer research which deals with the combination of real-world images and virtual-world images such as computer graphic images. In other words, augmented reality systems can combine a real environment with virtual objects.

In many augmented reality applications, positions of objects displayed on a screen of a device are calculated using the user's position (i.e., device GPS coordinates), the direction in which the user is facing (by using a device compass) and an accelerometer. However, the location data provided by the device's GPS unit may not be accurate. For consumer GPS applications, accuracy of geographical coordinates provided by a GPS unit is generally not more than 20 meters. Similarly, the location orientation information from the compass and accelerometer may be inaccurate due to magnetic interferences from, for example, buildings (e.g., steel structures). Accordingly, the orientation of the compass may be inaccurate. Because the location and orientation information are inaccurate, the virtual-world may be superimposed at an incorrect location on real-world imagery. This degrades the user's augmented reality experience.

BRIEF SUMMARY

Embodiments relate to augmenting reality with Earth data, where Earth data can refer to any Geographic Information System (GIS), including any terrain model and ground imagery. An embodiment includes a method for augmenting reality that includes computing a real-world depth map using real-world imagery captured by an imaging device. The method includes providing perspective information including location coordinates representing a location of the imaging device and rendering a computed depth map based on geographical data retrieved from a server in response to the providing of perspective information, where the geographical data corresponds to at least the location of the imaging device. Further, the method correlates the real-world depth map with the computed depth map to improve accuracy of the location of the imaging device represented by the location coordinates. The method then overlays the real-world imagery with virtual information based on the correlated real-world depth map and the computed depth map.

In this way, by improving accuracy of the location of the imaging device, embodiments are able to superimpose virtual objects and features at geographically accurate locations on real-world imagery. This improves a user's augmented reality experience.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments relate to augmenting reality with Earth data. As discussed above, an embodiment includes computing a real-world depth map using real-world imagery captured by an imaging device. The embodiment also includes providing location coordinates representing a location of the imaging device to a rendering engine. The embodiment renders a computed depth map using geographical data retrieved from a server. The server can, for example, store geographical data such as locations of terrain and non-terrain features on the surface of the Earth. The geographical data corresponds to the location of the imaging device. Finally, the real-world depth map is correlated with the computed depth map to improve accuracy of the location of the imaging device represented by the location coordinates. The embodiment can overlay the real-world imagery with virtual information based on the correlated real-world depth map and the computed depth map. The real-world depth map may also be referred to as a camera depth map that is computed based one or more images captured by the imaging device.

As a non-limiting example, a mobile device (or any other imaging device) may capture real-world imagery using a camera coupled to the mobile device. The mobile device may, for example, provide its Global Positioning System (GPS) location coordinates to the server. However, the location data provided by the device's GPS unit may not be accurate because accuracy of geographical coordinates provided by a GPS unit is generally not more than 5-20 meters. As a result, the virtual-world may be superimposed at an incorrect location on real-world imagery or incorrectly calibrated with the real-world imagery.

However, by rendering a computed depth map using geographical data retrieved from the server corresponding to the location (and possibly orientation) of the imaging device, and correlating the real-world depth map with the computed depth map, embodiments improve accuracy of the location (and possibly orientation) of the imaging device represented by the location coordinates. In this way, by improving accuracy of the location of the imaging device, embodiments are able to superimpose virtual objects and features at geographically accurate locations on real-world imagery. This improves a user's augmented reality experience.

While the present embodiments are described herein with reference to illustrative applications, it should be understood that the embodiments are not limited thereto. Those skilled in the art with access to the teachings provided herein will recognize additional modifications, applications, and embodiments within the scope thereof and additional fields in which the embodiments would be of significant utility.

Figure 1:
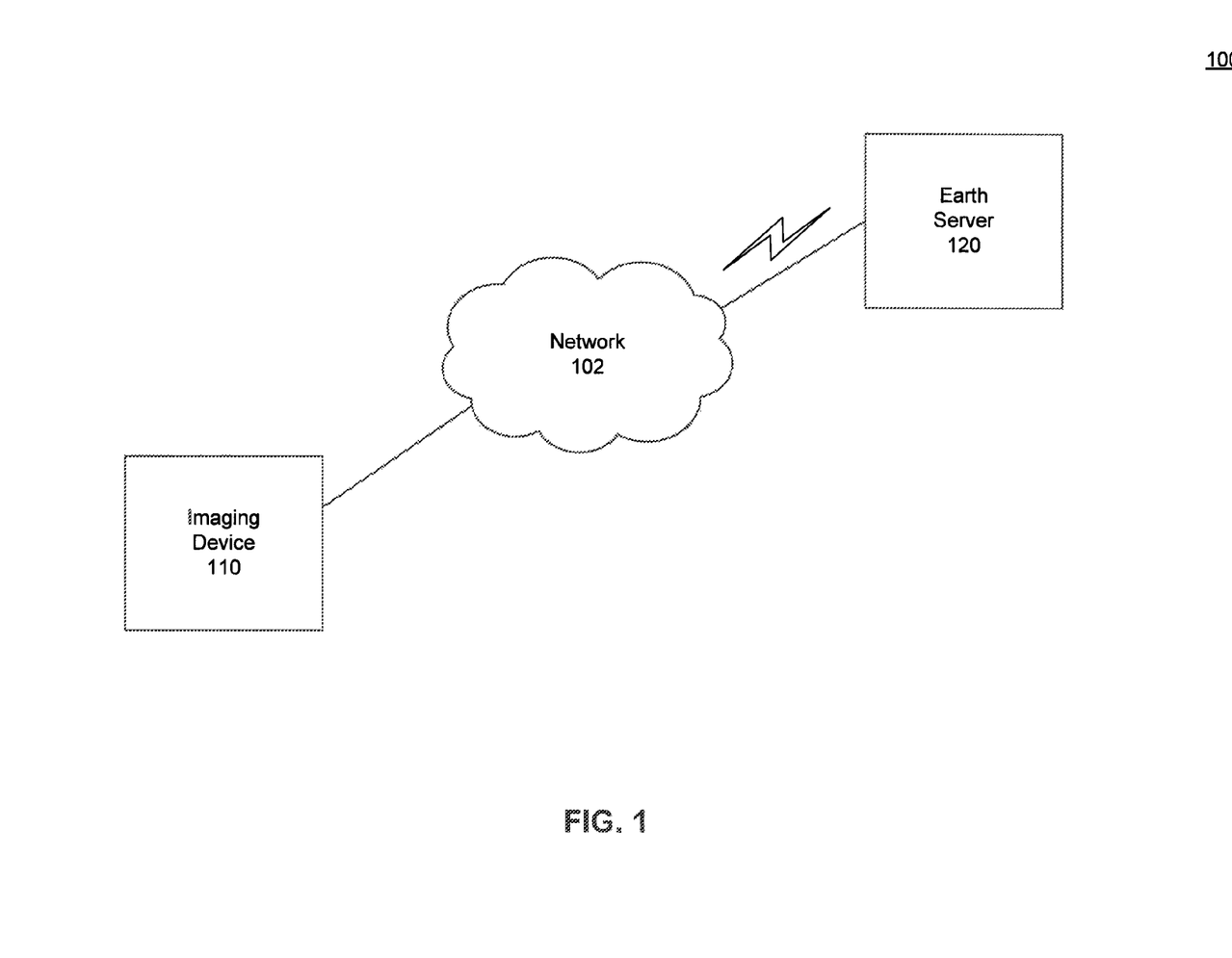
FIG. 1 illustrates a system for augmenting reality with Earth data retrieved from a server, according to an embodiment.

FIG. 1 is a diagram of a system 100 for augmenting reality with Earth data, according to an embodiment. While the following is described in terms of geographical and terrestrial data, the embodiments are not limited to such data and the techniques described herein and can be applied to any other form of data, including, but not limited to, oceanic data, astronomical data, extraterrestrial data, or any combination thereof. The embodiments are applicable to any system having generally the structure of FIG. 1, or that would benefit from the operation, methods and functions as described herein.

System 100 includes imaging device 110 and Earth server 120 connected over network 102. In the embodiment illustrated in FIG. 1, imaging device 110 can be any mobile device (or any other device) that includes a camera and a display. In a non-limiting embodiment, an imaging device can be configured to compute one or more depth maps using imagery derived from an image capture device or pre-captured information. One or more depth maps may be computed in a variety of ways. In an example, a hardware processor may use stereo vision to extract depth information. In another example, a depth map from defocus algorithm may be used to extract depth information. Other algorithms may be also be used. As a non-limiting example, a depth map can include information relating to the distance of surfaces of scene objects from a viewpoint. Imaging device 110 and depth maps are discussed further below.

In an embodiment, Earth server 120 stores geographic data relating to Earth terrain information as well as accurate locations of terrain features and non-terrain objects (e.g., buildings, roads, etc.) on the surface of the Earth. Earth server 120 can be configured to store data in any format. Earth server 120 may include any geographic or terrestrial data including road maps of geographical regions. Earth server 120 may also include any other form of data that is associated with one or more terrestrial, oceanic or astronomical regions. In a non-limiting embodiment, Earth server 120 may also be configured to compute one or more depth maps using geographic data and imagery. Imaging device 110 and depth maps are discussed further below.

Network 102 may include one or more networks, including but not limited to, a local area network, medium-area network, and/or wide-area network, such as the Internet. Network 102, for example, may be any form of wired or wireless network that allows imaging device 110, Earth server 120, and any additional clients or servers to communicate with each other.

In an embodiment, imaging device 110 can be any type of processing (or computing) device having one or more processors. For example, client 120 can be a workstation, mobile device (such as a mobile phone tablet or laptop), computer, cluster of computers, set-top box, touch screen device, a vehicle mounted with any type of camera, embedded system, console, or other device having at least one processor. Such a processing device may include software, firmware, hardware, or a combination thereof. Software may include one or more applications and an operating system. Hardware can include, but is not limited to, a processor, memory and graphical user interface display. A user can interact with imaging device 110 to provide data to imaging device 110 and receive (or view) data from imaging device 110.

Figure 2:
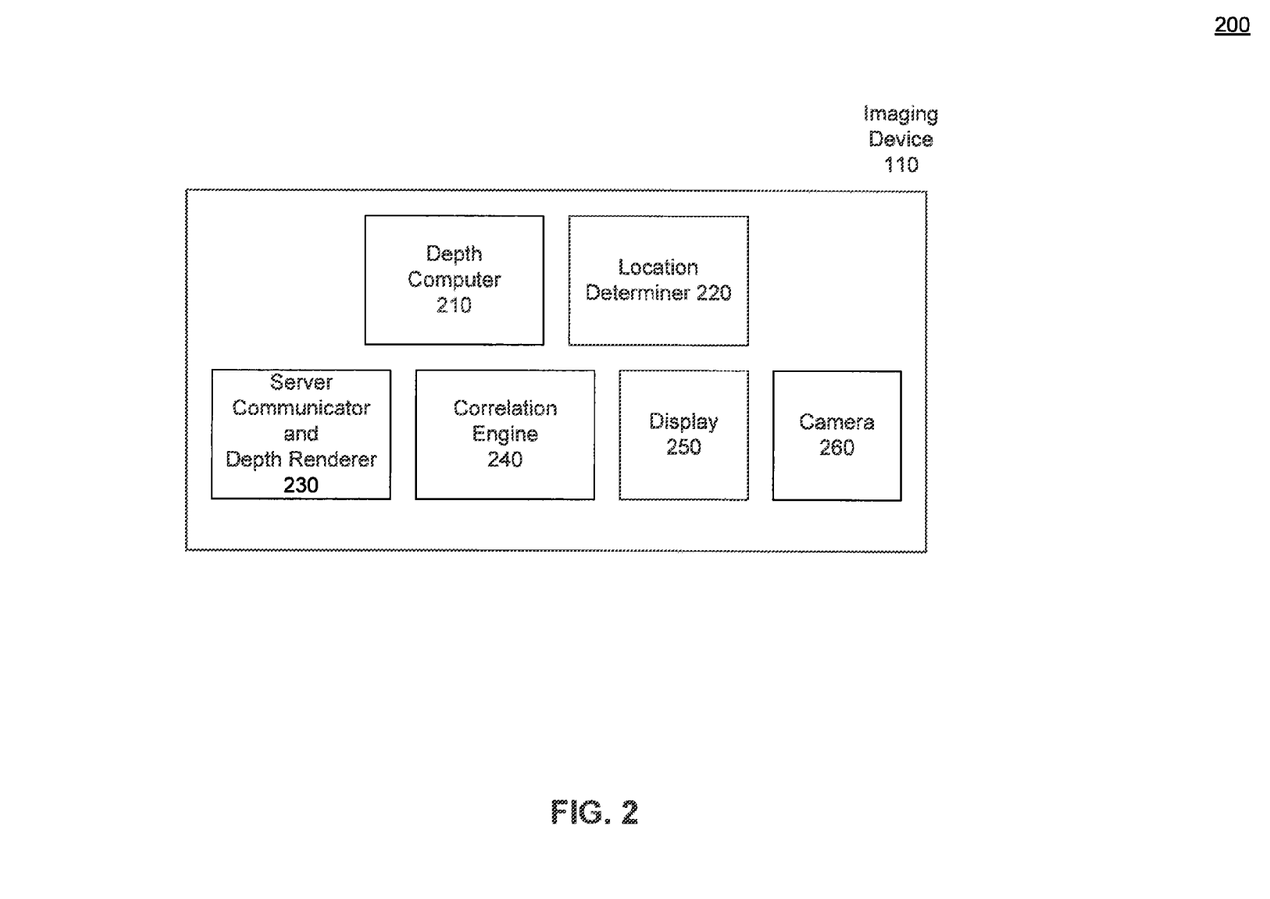
FIG. 2 illustrates a diagram of an imaging device, according to an embodiment.

FIG. 2 illustrates a diagram of imaging device 110 in greater detail, according to an embodiment. As shown in FIG. 2, imaging device includes depth computer 210, server communicator and depth renderer 230, location determiner 220, correlation engine 240, display 250, and camera (imaging and video device) 260.

Imaging and video device 260 is a camera that is configured to capture video imagery, still imagery or any combination thereof. In an embodiment, imaging device 110 device provides video data to display 250. In this way, for example, display 250 is able to display real-world imagery to a user using imaging device 110.

Location determiner 220 is configured to determine a location of imaging device 110. The determined location can include, but is not limited to, geographical location coordinates (e.g., latitude and longitude coordinates) or any other relative or absolute location data. In one non-limiting example, the location coordinates can include Global Positioning Satellite (GPS) coordinates. GPS coordinates are well known to those skilled in the art. In another example, the location coordinates can use any geographic coordinate that enables any location on the Earth to be specified by a set of numbers. The coordinates may, for example, be chosen such that one of the numbers represents vertical position, and two or three of the numbers represent horizontal position. One example choice of coordinates is latitude, longitude and elevation. In an embodiment, location determiner 220 can also provide orientation information and gyroscopic information. Orientation information can include, but is not limited to, angle(s) with respect to any axis (e.g., axis of movement/rotation) of imaging device 110 or camera 260.

Depth computer 210 computes a real-world depth map using real-world imagery captured by imaging device 110. As discussed above, a depth map may be computed in a variety of ways. In a non-limiting embodiment, depth computer 210 can compute a depth map using depth by defocus. Depth by defocus is a depth estimation method known to those skilled in the art that may utilize defocussed images from a scene to compute depth of objects in the scene. Other techniques, such as structure from motion, may also be used. It is to be appreciated that embodiments may utilize any other methods to compute a real-world depth map that are known now or developed in the future.

The real-world depth map may be calculated such that each pixel of the real-world depth map corresponds to a pixel of the real-world image produced by camera 260. At each pixel, the real-world depth map may include a data value indicating a distance from the imaging device 110 to a feature illustrated in the real-world image captured by camera 260.

Location determiner 220 is configured to determine perspective information including location coordinates representing a location of imaging device 110. Perspective information can represent a way in which objects appear to the eye based on their spatial attributes; or their dimensions and the position of the eye relative to the objects. As an example, perspective information may indicate whether real-world imagery has an aerial perspective (e.g., top to bottom perspective) or any other perspective associated with imaging device 110. Location determiner 220 may use a GPS sensor to determine location, and a compass and/or gyroscope accelerometer sensors to determine orientation. Once determined, the location determiner 220 may send the perspective information to Earth server 120.

In response to the perspective information, Earth server 120 may return geographic data in the surrounding area. The geographic data may include, for example, three-dimensional model data representing the surrounding area. The three-dimensional model data could include, for example, three-dimensional models of the surrounding terrain and buildings.

In an embodiment, the three-dimensional models may be represented as a mesh of triangles. The geographic data may include geographic features geocoded within a predefined perimeter of the location in the perspective information. In an alternative embodiment, the geographic data may include geographic features geocoded within a field of view defined by the perspective information.

In addition to the three-dimensional model data, the geographic data may also include geographic features to overlay onto the real world display. For example, the geographic data could include information representing utility lines (such as electric, gas, etc.), a heat map representing intensity information over various geographic areas (such as real estate price information, crime levels, etc.), radiowave coverage or blind spots, and information for online gaming.

Using the received three-dimensional model data, server communicator and depth renderer 230 renders a computed depth map using geographical data retrieved from the Earth server 120. To render the depth map, the received three-dimensional model data may be projected according to the perspective information of the camera. The resulting computed depth map may be calculated such that each pixel of the computed depth map includes a data value representing a distance from the perspective information of the camera to a trainer building objects in the three-dimensional model data. Moreover, each pixel of the computed depth map may correspond to a pixel of the real-world depth map and, accordingly, the pixel of a real-world image produced by camera 260.

In an embodiment, correlation engine 240 correlates a real-world depth map with a computed depth map to improve accuracy of the location of the imaging device represented by the location coordinates and overlays the real-world imagery with virtual information based on the correlated real-world depth map and the computed depth map. The operation of correlation engine 240 is discussed further below.

In an embodiment, correlation engine 240 extracts edge information from real-world imagery captured by imaging device 110. In an embodiment, correlation engine 240 extracts edge information from a rendered computed depth map generated by server communicator and depth renderer 230 to determine one or more horizon lines. In another embodiment, correlated points may be extracted using a Scale-invariant feature transform (SIFT) algorithm. SIFT may provide a technique of multi-resolution processing to extract variant points in a raster map.

A depth map may be computed based on the Earth data stored on the server. The depth map may be rendered from a specific view point that is reported by a GPS device or estimated location of the device based on an estimated compass orientation of the device. In an example, a client device (e.g., cellular phone) computes the depth map based on the Earth data stored on the server and renders the depth map. In another example, the server computes the depth map based on the Earth data stored on the server, and the camera renders the depth map. The computed depth map may then be correlated with the real-world depth map based on the real-world imagery captured by imaging device 110.

Correlation engine 240 can correlate one or more points on the horizon lines with one or more points in the edge information extracted from the real-world imagery. In this way, by correlating the real-world depth map with the rendered computed depth map, correlation engine 240 improves accuracy of the location of the imaging device represented by the location coordinates. In this way, embodiments are able to superimpose (or overlay) virtual objects and features at geographically accurate locations on real-world imagery. This improves a user's augmented reality experience.

In an embodiment, correlation engine 240 determines a field of view and a corresponding focal point of imaging device 110, where the location of the focal point corresponding to the location coordinates is provided by imaging device 110. Correlation engine 240 can align the one or more points on the horizon lines to exactly or substantially coincide with the one or more points in the edge information extracted from the real-world imagery.

Real-world imagery and image processing may be used to extract additional ridge lines. In an embodiment, the real-world depth map, in addition to the imagery, is used to extract horizon (ridge) lines. The imagery may be complementary to add additional information that helps in finding more control points. The additional information may aid in correlating the real-world depth map and the computed depth map. In an example, ridge lines may be extracted from the imagery based on the change in correlation in tones that are typically consistent with ridge lines. The imagery may show some ridge lines that are less obvious to detect in a depth map, and the ridges lines identified in the imagery and the real-world depth map may be used and correlated with the rendered depth map.

In a non-limiting embodiment, the alignment generates an updated location for the focal point, where the updated location of the focal point corresponds to accurate location coordinates of imaging device 110.

In an embodiment, when correlation engine 240 detects a change in the field of view of the imaging device 110, correlation engine 240 re-aligns one or more points on the horizon line to exactly or substantially coincide with the one or more points in the edge information extracted from real-world imagery. In an embodiment, the re-alignment generates another updated location for the focal point corresponding to updated accurate location coordinates of imaging device 110.

In this way, correlation engine 240 maintains correlation between the real-world depth map with the rendered computed depth map even when a change in the field of view of imaging device 110 is detected. Because correlation is maintained, the accuracy of accurate location coordinates generated by correlation engine 240 is maintained and the embodiments are able to superimpose (or overlay) virtual objects and features at geographically accurate locations on real-world imagery. This improves a user's augmented reality experience.

Figure 6A:
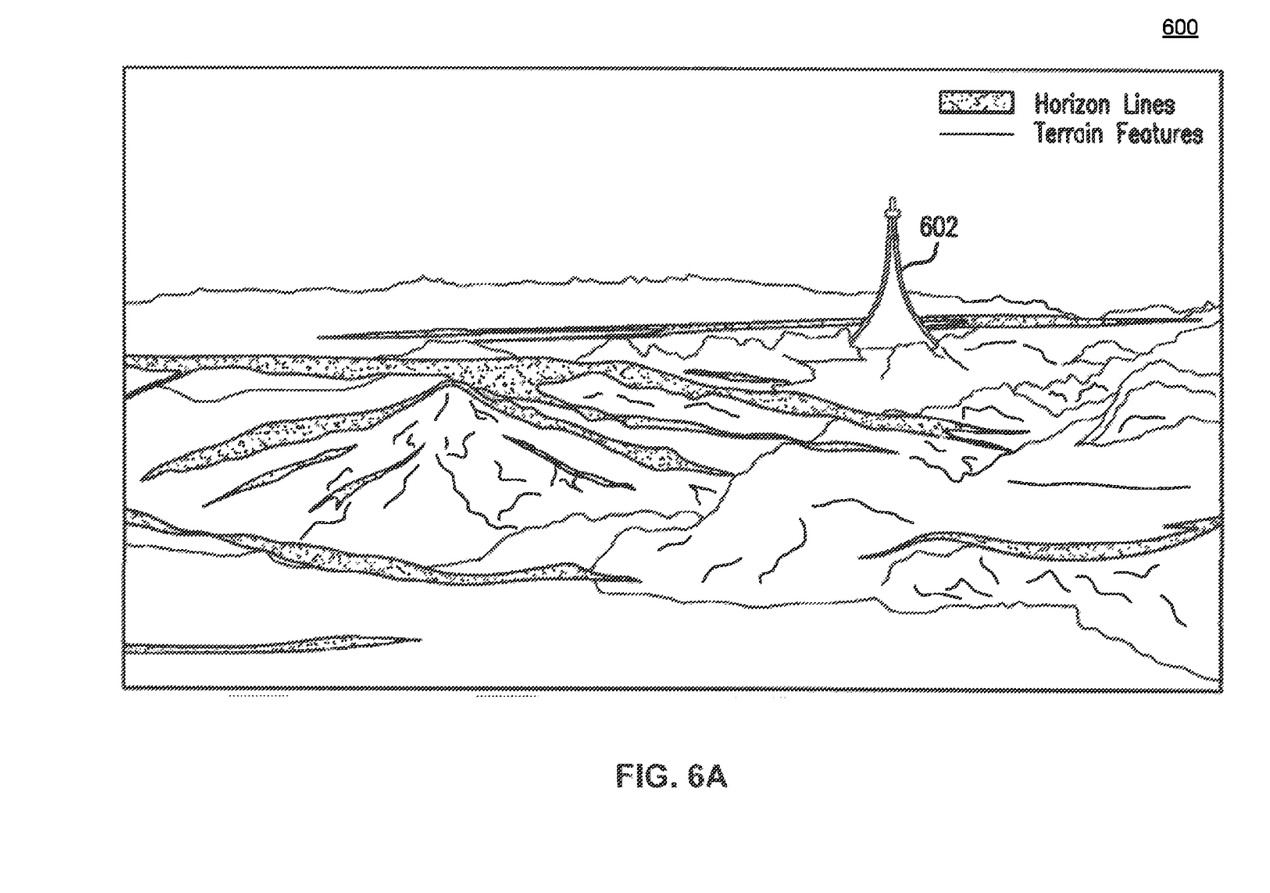
FIGS. 6A and 6B are drawings illustrating example field of views, according to an embodiment.

FIG. 6A illustrates an example field of view 600. Field of view 600 may be displayed on display 250 of imaging device 110. Field of view 600 includes a virtual object 602 that is superimposed on the real-world imagery of field of view 600. FIG. 6A also illustrates a plurality of horizon lines that are correlated with a plurality of terrain features, such that the horizon lines exactly or substantially coincide with the terrain features. Using correlation engine 240, embodiments are able to superimpose (or overlay) virtual object 602 at a geographically accurate location on real-world imagery in field of view 600. This improves a user's augmented reality experience.

Correlation engine 240 may identify control points in a frame. The control points identified in the frame may be present in a subsequent frame and absent from another subsequent frame. In an embodiment, correlation engine 240 identifies control points in a frame and predicts the location of control points in a subsequent frame based on the current position. Sensors (e.g., gyroscope) may determine accurate short-term motion change and may be used to predict the location of the identified control points in subsequent frames. In a non-limiting embodiment, correlation engine 240 utilizes gyroscopic data to predict one or more movements to one or more points in the edge information extracted from the real-world imagery. These movements may be caused when, for example, a user spatially relocates (or moves) imaging device 110.

In an embodiment, correlation engine 240 can determine a distance between one or more pixels displayed in the field of view of imaging device 110 and the accurate location coordinates of the imaging device 110 determined by correlation engine 240. After the control points are identified, the correlation may be restricted to an area surrounding the predicted location of the control points in subsequent frames. The correlation search may be limited to an area surrounding the control point for the next frame, and ridge lines may be extracted from the area. This may improve processing time because the entire depth map does not need to be correlated.

In an embodiment, correlation engine 240 can place (or overlay) virtual objects in the real-world imagery based on the accurate location coordinates of the imaging device and the rendered computed depth map, where the virtual objects may be occluded by real-world features in the real-world imagery based on positions of the real-world features relative to the virtual objects.

Figure 6B:
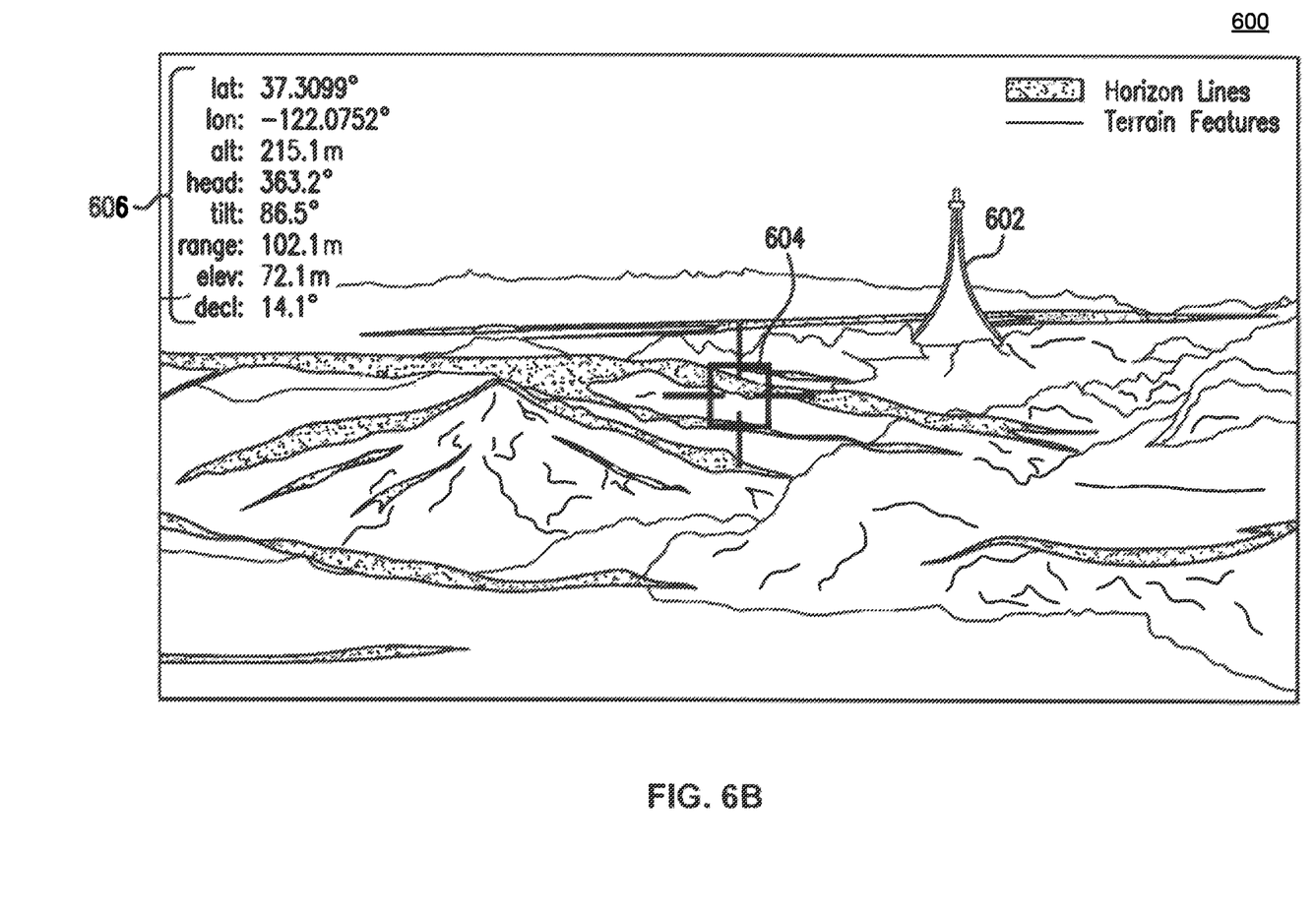

FIG. 6B illustrates an example field of view 600. Field of view 600 may be displayed on display 250 of imaging device 110. Field of view 600 includes a virtual object 602 that is superimposed on the real-world imagery of field of view 600. In an embodiment, crosshair 604 is provided by imaging device 110. Crosshair 604 may be located (e.g., located by a user) to any location in field of view 600. The location of crosshair 604 corresponds to one or more pixels in field of view 600. In an embodiment, crosshair 604 (or any other user interface element) may be used to select one or more pixels in field of view 600. As an example, when a pixel is selected, correlation engine 240 can determine a distance between one or more pixels displayed in the field of view of imaging device 110 and the accurate location coordinates of the imaging device 110 are determined by correlation engine 240. Parameters associated with the location represented by the selected pixel may be displayed as parameters 606. These parameters may include, but are not limited to, latitude, longitude, altitude, tilt, range, elevation, declination, etc. In this way, a user may use crosshair 604 as a range-finder to determine distance of an object in a real-world scene.

Figure 3:
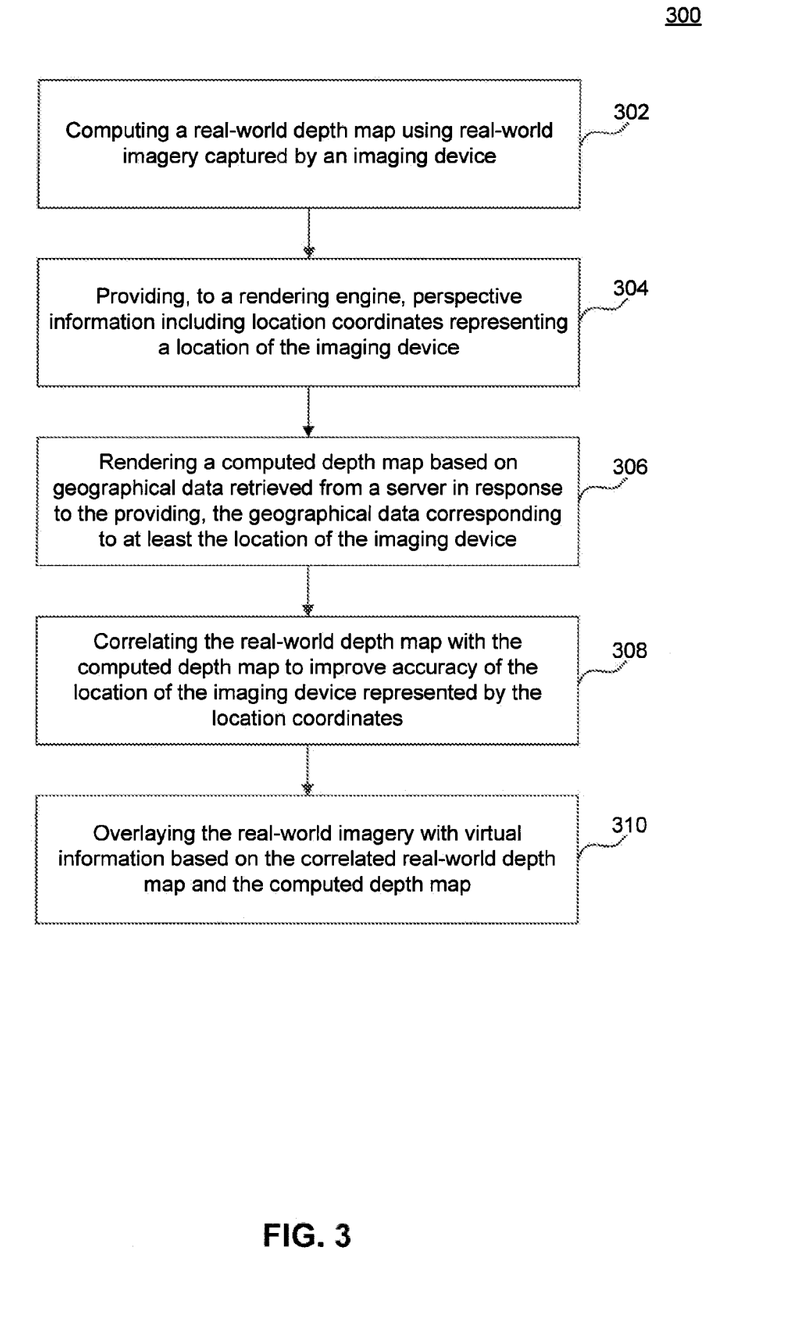
FIG. 3 is a flowchart illustrating an example operation for depth map correlation, according to an embodiment.

FIG. 3 is a flowchart 300, illustrating an example of overall operation according to an embodiment. Method 300 begins with computing a real-world depth map using real-world imagery captured by an imaging device (stage 302). Perspective information including location coordinates representing a location of the imaging device is provided to a rendering engine (stage 304). Method 300 proceeds by rendering a computed depth map based on geographical data retrieved from a server in response to the providing, the geographical data corresponding to at least the location of the imaging device (stage 306). The real-world depth map is correlated with the computed depth map to improve accuracy of the location of the imaging device represented by the location coordinates (stage 308), and real-world imagery can be overlaid with virtual information based on the correlated real-world depth map and the computed depth map (stage 310).

Figure 4:
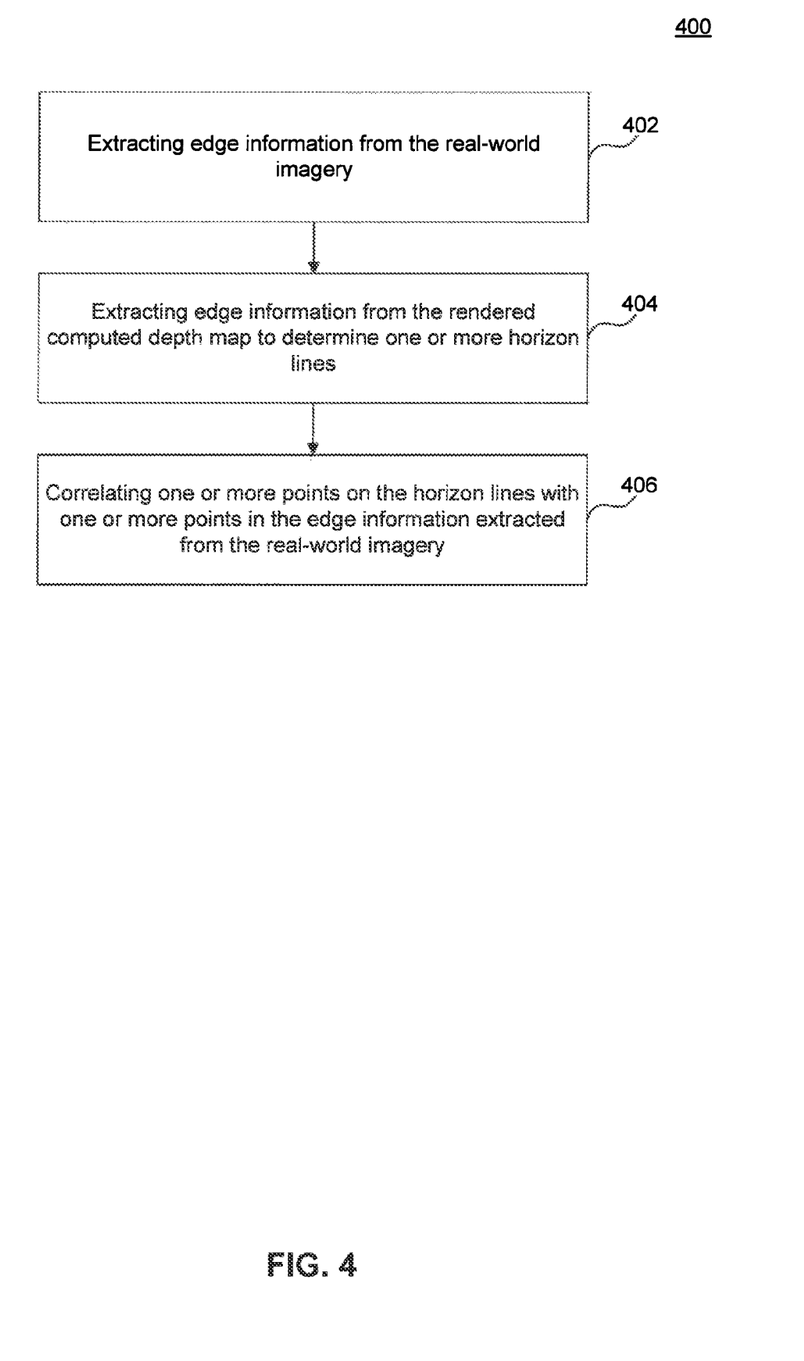
FIG. 4 is a flowchart illustrating another example correlation operation, according to an embodiment.

FIG. 4 is a flowchart 400 illustrating step 308 of FIG. 3 in greater detail, according to an embodiment. Method 400 begins with extracting edge information from the real-world imagery (stage 402) and extracting edge information from the rendered computed depth map to determine one or more horizon lines (stage 404). Method 400 proceeds by correlating one or more points on the horizon lines with one or more points in the edge information extracted from the real-world imagery. Other techniques may also be used to extract information and identify features in both the real-world depth map and the computed depth map (e.g., SIFT algorithm).

Figure 5A:
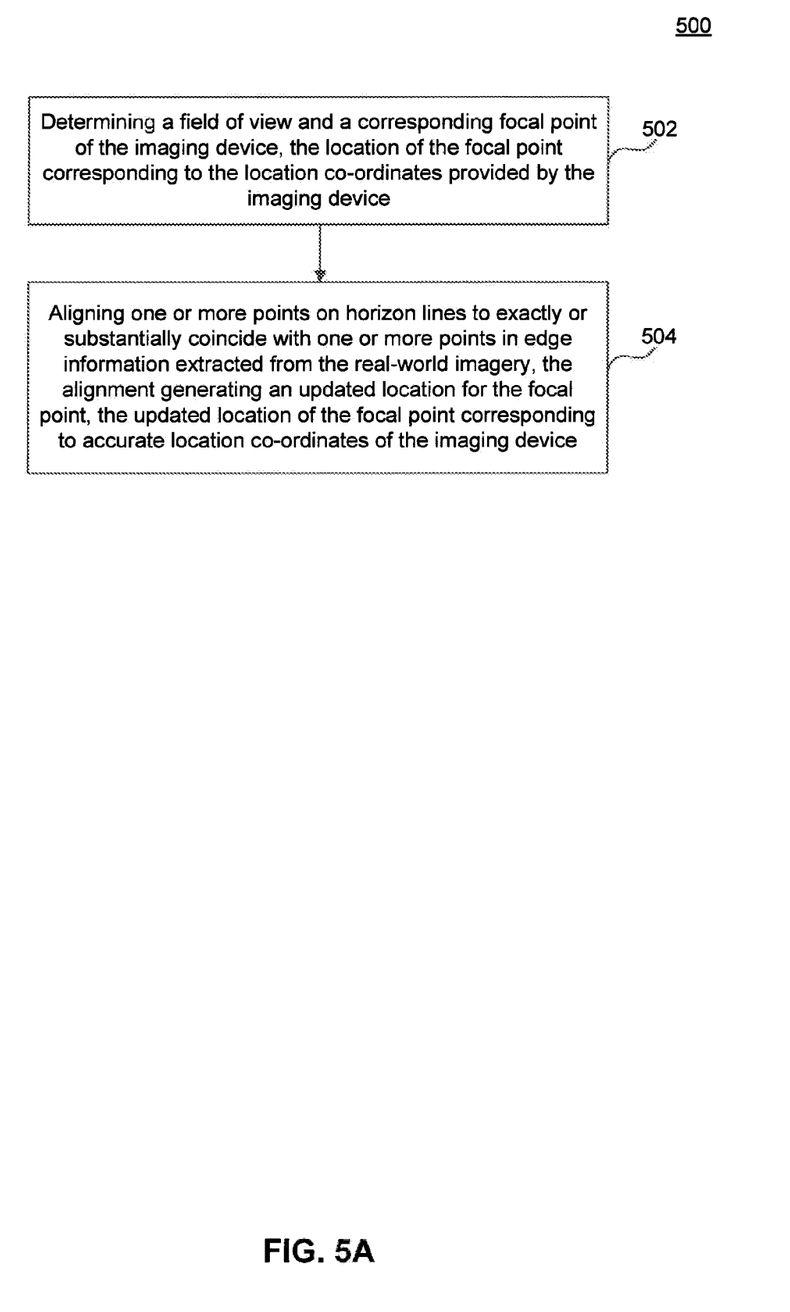
FIG. 5A is a flowchart illustrating an example alignment operation, according to an embodiment.

FIG. 5A is a flowchart 500 illustrating an example alignment operation, according to an embodiment. Method 500 begins with determining a field of view and a corresponding focal point of the imaging device, where the location of the focal point corresponds to the location coordinates provided by the imaging device (stage 502). Method 500 proceeds by aligning the one or more points on the horizon lines to exactly or substantially coincide with the one or more points in the edge information extracted from the real-world imagery, the alignment generating an updated location for the focal point, the updated location of the focal point corresponding to accurate location coordinates of the imaging device (stage 504).

Figure 5B:
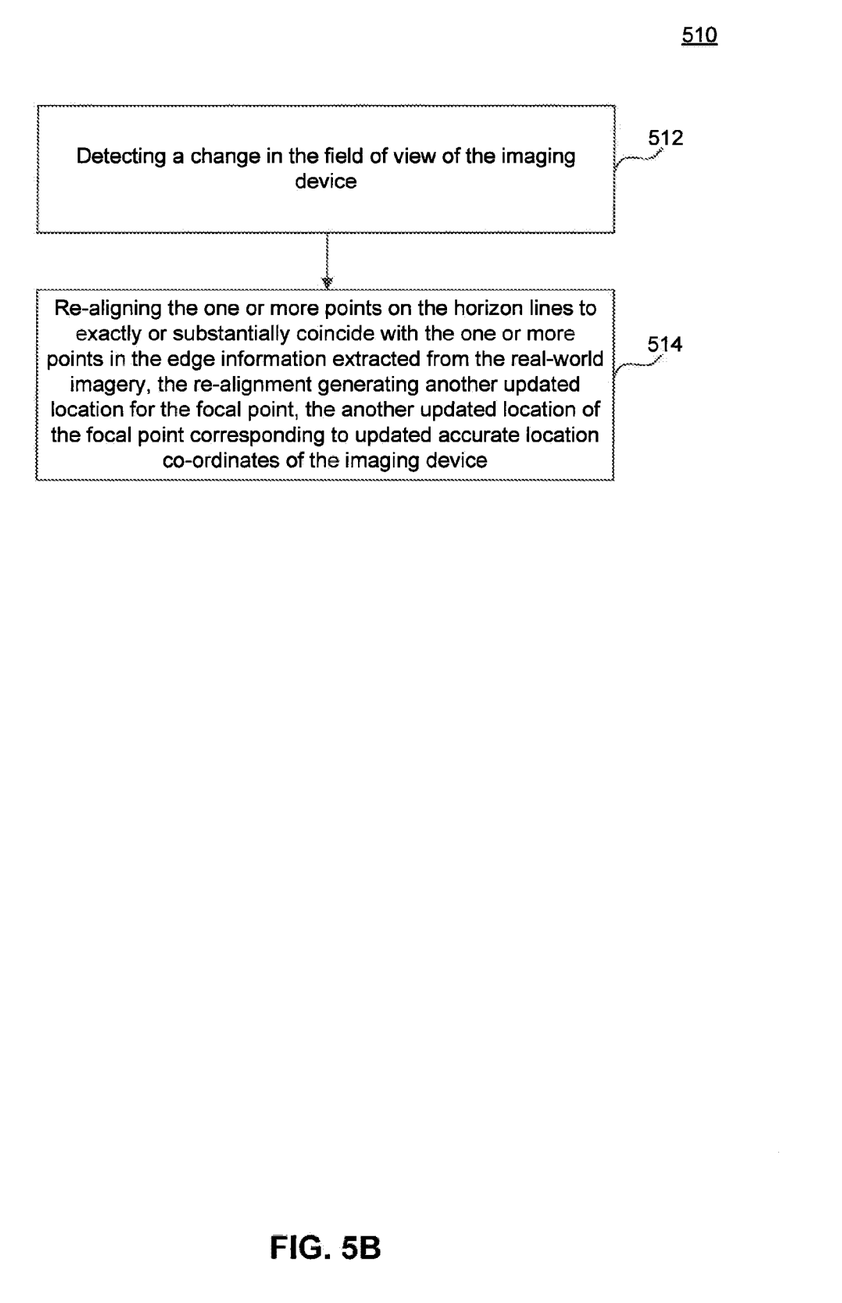
FIG. 5B is a flowchart illustrating an example re-alignment operation, according to an embodiment.

FIG. 5B is a flowchart illustrating an example re-alignment operation, according to an embodiment. Method 510 begins with detecting a change in the field of view of the imaging device (stage 512). Method 510 proceeds by re-aligning the one or more points on the horizon lines to exactly or substantially coincide with the one or more points in the edge information extracted from the real-world imagery, the re-alignment generating another updated location for the focal point, the another updated location of the focal point corresponding to updated accurate location coordinates of the imaging device (stage 514).

In this way, correlation engine 240 maintains correlation between the real-world depth map with the rendered computed depth map even when a change in the field of view of imaging device 110 is detected. Because correlation is maintained, the accuracy of accurate location coordinates generated by correlation engine 240 is maintained and the embodiments are able to superimpose (or overlay) virtual objects and features at geographically accurate locations on real-world imagery. This improves a user's augmented reality experience.

Figure 7:
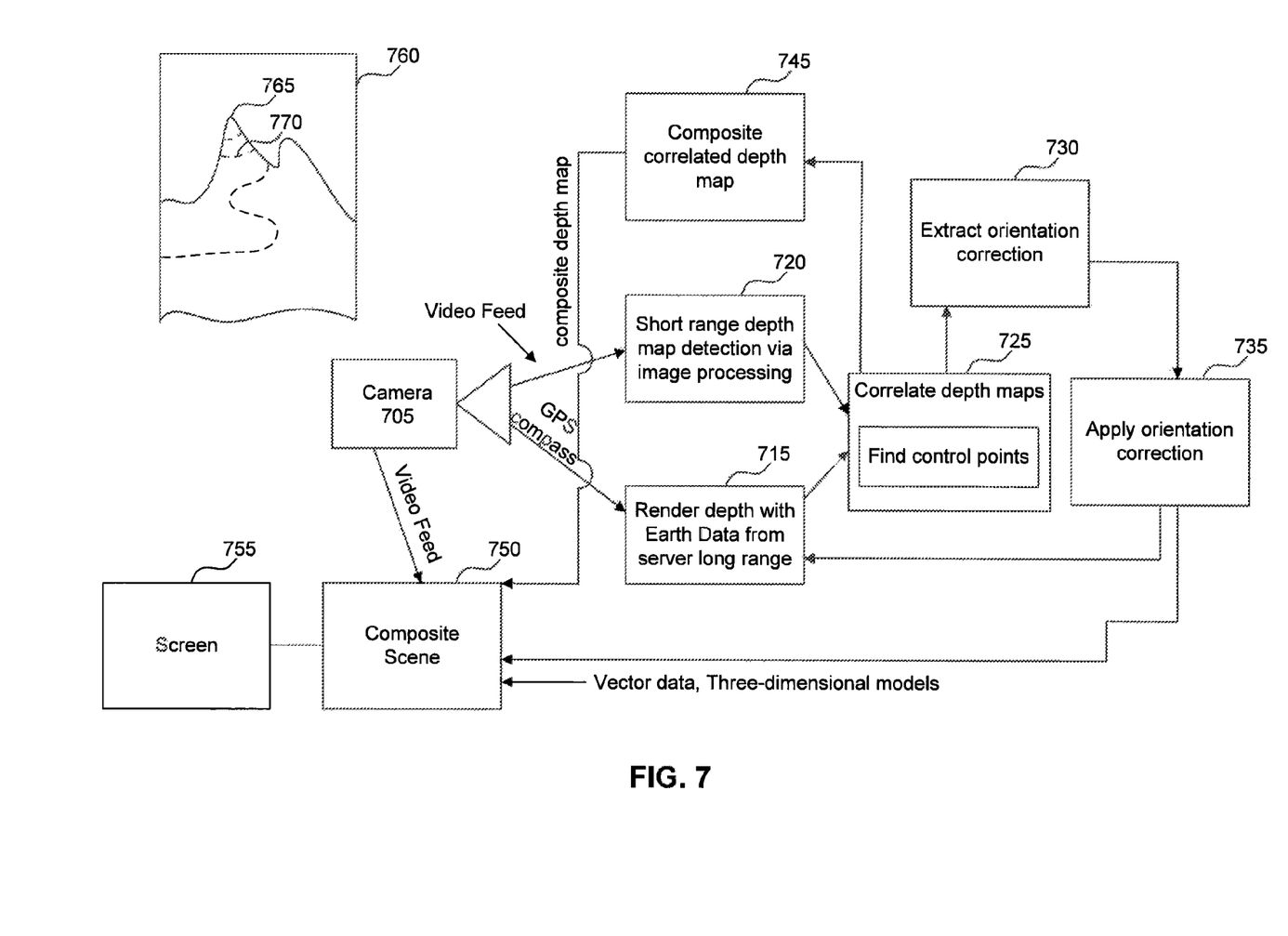
FIG. 7 is a flow chart illustrating an example feedback loop between a video feed and GPS/accelerometer information, according to an embodiment.

FIG. 7 is a flow chart illustrating an example feedback loop between a video feed, GPS, and accelerometer information, according to an embodiment.

An imaging device may include a camera 705 that captures video imagery in the real world. A location of camera 705 may be determined by the imaging device's GPS coordinates and the direction in which the user is facing may be determined by using the imaging device's compass and accelerometer.

At a stage 715, the GPS coordinate and compass information may be sent to a server that stores geographic data corresponding to the location of the imaging device. In an example, camera 705 may have a field of view of 40 degrees, and the server may generate a 360-degree panorama of the landscape (including the image captured by the 40-degree field of view of camera 705) based on the location of the imaging device in the real world. The server may return geographic data in the surrounding area to the imaging device. The imaging device may use the geographic data and render a computed depth map based on the geographical data retrieved from the server.

At a stage 720, the imaging device may compute a real-world depth map. The real-world depth map may be a short-range depth map. More details on this are presented below.

The imaging device may implement an image processing algorithm to compute the real-world depth map. In an example, the imaging device computes a real-world depth map via depth from defocus. Depth from defocus may be computed by changing a focal length of the camera, identifying which objects in the images are in the foreground and in the background and a distance between these objects, and computing an approximate depth map based on the captured images and the focal distance of the camera when the image was taken. The imaging device may implement an image processing algorithm different from depth from defocus. For example, the imaging device may compute a real-world depth map via stereo capture of the depth map with a pair of cameras.

As discussed above, the GPS coordinate and compass information obtained by the imaging device may be inaccurate. To help fix this problem, the real-world view may be correlated with the generated view of accurate data from the server to identify the actual location of the imaging device.

At a stage 725, the real-world depth map may be correlated with the computed depth map to improve accuracy of the location of the imaging device represented by the location coordinates. Stage 725 may include finding control points. Control points may be determined from the images (e.g., the images captured by camera 705). A control point may refer to a recognizable point identifiable in both the generated depth map and the depth map from the video feed. An example control point is a corner of a building. One or more control points may indicate an amount in which the actual camera location is offset from the detected location information.

At a stage 730, an orientation correction associated with the location of the imaging device may be extracted based on correlating the real-world depth map with the computed depth map. In an example, the orientation correction may be extracted and applied to the camera to match corresponding control points so that they align.

In an embodiment, features such as ridge lines are extracted separately from stages 715 and 720. Matching control points may be extracted from these ridge lines. In an example, at stage 730 the disparity between these control points may then be used to extract orientation corrections. Extracting ridge lines is one example of extracting features for the correlation between the real-world depth map and the computed depth map. Other features may be extracted.

At a stage 735, the orientation correction may be applied to the location information of the imaging device. In an example, the orientation correction is applied to correct the compass information that is displayed in the composite scene at a stage 750. In another example, the orientation correction is applied to tune the view information that is used to generate the depth map with the server data at stage 715 and to render the overlay information. In an example, the overlay information may include virtual objects 602 and parameters 606 in FIG. 6B.

The video feed may be strongly correlated with generating a short-range depth map (at stage 720). In an embodiment, additional ridge lines are extracted from the video feed directly, and these ridges line may be used to correct the orientation disparity between the short- and long-range depth maps. In an example, a horizon line may be a good source of information to correlate with the server-based depth map (at stage 715) because the outline of the horizon from the video feed may be accurate. This may be the case even though at stage 720 poor depth information may be computed for the horizon because it is far away.

At stage 745, a composite correlated depth map may be generated from correlating the depth maps at stage 725. A real-world depth map may provide accurate depth information when used short range. In contrast, the depth data from the server may provide accurate depth information when used long range. For example, the depth data from the server may provide a good approximation of the depth of mountains. The depth from the real-world depth map and the depth from the server may be blended together to have the best of both worlds in a composite depth map—the real-world depth map may provide accurate depth information from close range, and starting at a certain distance the depth data may be provided from the computed depth map and provide accurate depth information for long range.

At stage 750, a composite scene takes as input the video feed from the camera (real-world imagery), composite correlated depth map from stage 745, orientation correction information from stage 735, and vector data and three-dimensional models.

At stage 755, this input may be sent to a screen that displays an image 760. As discussed, the depth maps may be correlated with the video feed. For each location of the video feed, a distance may be determined between an object and the imaging device as well as whether the object or certain parts of the object are visible. For example, the server may include information about a road and a location of this road. The imaging device may be able to determine whether, for example, the road is visible from a particular camera view. The road may be displayed such that it disappears behind a mountain and reappears on a side of the mountain.

In an example, a mountain 765 in display image 760 is from the video feed and a road 770 in display image 760 is vector data drawn on top of the video feed. The depth information may be determined from the composite correlated depth map. Accordingly, road 770 may disappear behind mountain 765 at certain points and reappear in front of mountain 765 at other points.

In this way, virtual objects and features may be superimposed at geographically accurate locations on real-world imagery. This may improve a user's augmented reality experience.

Example Computer Embodiment

Figure 8:
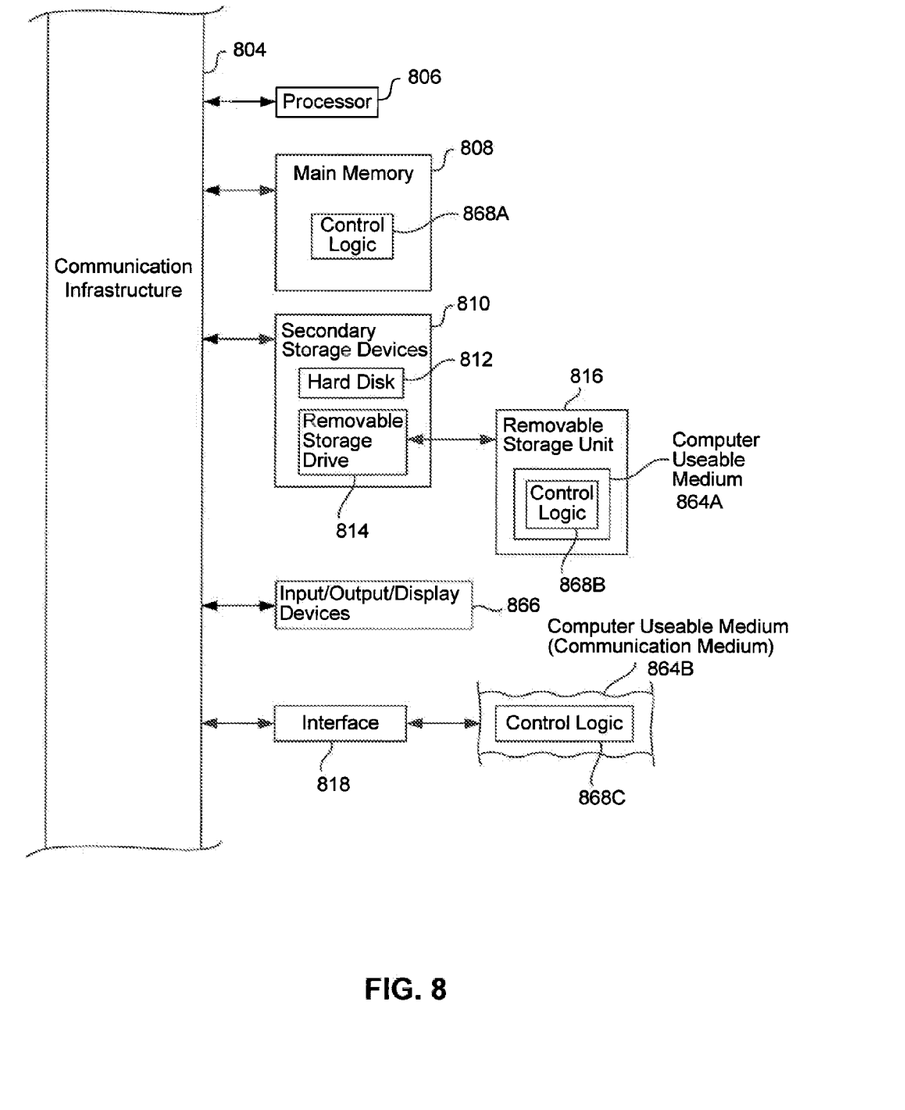
FIG. 8 illustrates an example computer useful for implementing components of embodiments.

In an embodiment, the system and components of embodiments described herein are implemented using well known computers, such as example computer 802 shown in FIG. 8. For example, imaging device 110 and Earth server 120 can be implemented using computer(s) 802.

Computer 802 can be any commercially available and well known computer capable of performing the functions described herein.

Computer 802 includes one or more processors (also called central processing units, or CPUs), such as a processor 806. Processor 806 is connected to a communication infrastructure 804. In an example, computer 802 may be a mobile device (e.g., smart phone) including an on-board processor serving as the processor for computer 802. In another example, computer 802 may be a tablet including an on-board processor serving as the processor for computer 802.

Computer 802 also includes a main or primary memory 808, such as random access memory (RAM). Primary memory 808 has stored therein control logic 868A (computer software), and data.

Computer 802 also includes one or more secondary storage devices 810. Secondary storage devices 810 include, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 864A having stored therein computer software 868B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 802 also includes input/output/display devices 866, such as monitors, keyboards, pointing devices, Bluetooth devices, etc.

Computer 802 further includes a communication or network interface 818. Network interface 818 enables computer 802 to communicate with remote devices. For example, network interface 818 allows computer 802 to communicate over communication networks or mediums 864B (representing a form of a computer useable or readable medium), such as LANs, WANs, the Internet, etc. Network interface 818 may interface with remote sites or networks via wired or wireless connections.

Control logic 868C may be transmitted to and from computer 802 via communication medium 864B.

Any tangible apparatus or article of manufacture comprising a computer useable or readable medium having control logic (software) stored therein is referred to herein as a computer program product or program storage device. This includes, but is not limited to, computer 802, main memory 808, secondary storage devices 810 and removable storage unit 816. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof, The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A method for augmenting reality, comprising:
   computing a real-world depth map using real-world imagery captured by an imaging device;
   providing, to a rendering engine, perspective information including location coordinates representing a location of the imaging device;
   rendering a computed depth map based on geographical data retrieved from a server in response to the providing, the geographical data corresponding to at least the location of the imaging device;
   blending the real-world depth map with the computed depth map to generate a composite depth map by;
   placing depth data from the real-world depth map in the composite depth map for locations within a threshold distance, and
   placing depth data from the computed depth map in the composite depth map for locations beyond the threshold distance; and
   using the composite depth map to overlay the real-world imagery with virtual information.

2. The method of claim 1, wherein the blending further comprises:
   extracting edge information from the real-world imagery;
   extracting edge information from the rendered computed depth map to determine one or more horizon lines; and
   correlating one or more points on the horizon lines with one or more points in the edge information extracted from the real-world imagery.

3. The method of claim 2, wherein the blending further comprises:
   determining a field of view and a corresponding focal point of the imaging device, the location of the focal point corresponding to the location coordinates provided by the imaging device; and
   aligning the one or more points on the horizon lines to exactly or substantially coincide with the one or more points in the edge information extracted from the real-world imagery, the alignment generating an updated location for the focal point, the updated location of the focal point corresponding to accurate location coordinates of the imaging device.

4. The method of claim 3, wherein the blending, further comprises:
   detecting a change in the field of view of the imaging device; and
   re-aligning the one or more points on the horizon lines to exactly or substantially coincide with the one or more points in the edge information extracted from the real-world imagery, the re-alignment generating another updated location for the focal point, the another updated location of the focal point corresponding to updated accurate location coordinates of the imaging device.

5. The method of claim 4, further comprising:
   retrieving geographical data from the server corresponding to the updated field of view.

6. The method of claim 4, further comprising:
   utilizing gyroscopic data to predict one or more movements to one or more points in the edge information extracted from the real-world imagery, the movements causing the change in the field of view.

7. The method of claim 3, further comprising:
   determining a distance between one or more pixels displayed in the field of view and the accurate location coordinates of the imaging device.

8. The method of claim 3, further comprising:
placing virtual objects in the real-world imagery based on the accurate location coordinates of the imaging device and the rendered computed depth map, the virtual objects occluded by real-world features in the real-world imagery based on positions of the real-world features relative to the virtual objects.

9. A processor-based system for augmenting reality, comprising:
one or more processors;
a depth computer configured to compute a real-world depth map using real-world imagery captured by an imaging device;
a location determiner configured to provide, to a rendering engine, perspective information including location coordinates representing a location of the imaging device;
a server communicator and depth renderer configured to render a computed depth map based on geographical data retrieved from a server in response to the providing, the geographical data corresponding to at least the location of the imaging device; and
a correlation engine configured to blend the real-world depth map with the computed depth map to generate a composite depth map by placing depth data from the real-world depth map in the composite depth map for locations within a threshold distance, and placing depth data from the computed depth map in the composite depth for locations beyond the threshold distance, and using the composite depth map to overlay the real-world imagery with virtual information based.

10. The system of claim 9, wherein the correlation engine is further configured to:
extract edge information from the real-world imagery;
extract edge information from the rendered computed depth map to determine one or more horizon lines; and
correlate one or more points on the horizon lines with one or more points in the edge information extracted from the real-world imagery.

11. The system of claim 9, wherein the correlation engine is further configured to:
determine a field of view and a corresponding focal point of the imaging device, the location of the focal point corresponding to the location coordinates provided by the location determiner; and
align the one or more points on the horizon lines to exactly or substantially coincide with the one or more points in the edge information extracted from the real-world imagery, the alignment generating an updated location for the focal point, the updated location of the focal point corresponding to accurate location coordinates of the imaging device.

12. The system of claim 1 wherein the correlation engine is further configured to:
detect a change in the field of view of the imaging device; and
re-align the one or more points on the horizon lines to exactly or substantially coincide with the one or more points in the edge information extracted from the real-world imagery, the re-alignment generating another updated location for the focal point, the another updated location of the focal point corresponding to updated accurate location coordinates of the imaging device.

13. The system of claim 12, wherein the server communicator and depth renderer is configured to retrieve geographical data from the server corresponding to the updated field of view.

14. The system of claim 11, wherein the correlation engine is further configured to:
utilize gyroscopic data to predict one or more movements to one or more points in the edge information extracted from the real-world imagery, the movements causing the change in the field of view.

15. The system of claim 11, further comprising a range determiner configured to determine a distance between one or more pixels displayed in the field of view and the accurate location coordinates of the imaging device.

16. The system of claim 11, further comprising a virtual object renderer and occlusion determiner configured to place virtual objects in the real-world imagery based on the accurate location coordinates of the imaging device and the computed depth map, the virtual objects occluded by real-world features in the real-world imagery based on the position of the real-world features relative to the virtual objects.

17. The system of claim 9, wherein the real-world imagery includes a live video feed captured by the imaging device.

18. The system of claim 9, wherein the imaging device is a mobile device including a video camera and a display.

19. The system of claim 16, wherein the virtual objects include three dimensional structures.

20. A computer program product including a computer-readable storage device having instructions stored thereon that, when executed by a computing device, cause the computing device to perform operations comprising:
computing a real-world depth map using real-world imagery captured by an imaging device;
providing, to a rendering engine, perspective information including location coordinates representing a location of the imaging device;
rendering a computed depth map based on geographical data retrieved from a server in response to the providing, the geographical data corresponding to at least the location of the imaging device;
blending the real-world depth map with the computed depth map to generate a composite depth map by;
placing depth data from the real-world depth map in the composite depth map for locations within a threshold distance, and
placing depth data from the computed depth map in the composite depth map for locations beyond the threshold distance; and
using the composite depth map to overlay the real-world imagery with virtual information.

21. The computer program product of claim 20, wherein the blending further comprises:
extracting edge information from the real-world imagery;
extracting edge information from the rendered computed depth map to determine one or more horizon lines; and
correlating one or more points on the horizon lines with one or more points in the edge information extracted from the real-world imagery.

22. The computer program product of claim 21, wherein the blending further comprises:
determining a field of view and a corresponding focal point of the imaging device, the location of the focal point corresponding to the location coordinates provided by the imaging device; and
aligning the one or more points on the horizon lines to exactly or substantially coincide with the one or more points in the edge information extracted from the real-world imagery, the alignment generating an updated location for the focal point, the updated location of the focal point corresponding to accurate location coordinates of the imaging device.

23. The computer program product of claim 22, wherein the blending further comprises:
- detecting a change in the field of view of the imaging device; and
- re-aligning the one or more points on the horizon lines to exactly or substantially coincide with the one or more points in the edge information extracted from the real-world imagery, the re-alignment generating another updated location for the focal point, the another updated location of the focal point corresponding to updated accurate location coordinates of the imaging device.

24. The computer program product of claim 22, the operations further comprising:
- retrieving geographical data from the server corresponding to the updated field of view.

25. The computer program product of claim 22, the operations further comprising:
- utilizing gyroscopic data to predict one or more movements to one or more points in the edge information extracted from the real-world imagery, the movements causing the change in the field of view.

26. The computer program product of claim 22, the operations further comprising:
- determining a distance between one or more pixels displayed in the field of view and the accurate location coordinates of the imaging device.

27. The computer program product of claim 22, the operations further comprising:
- placing virtual Objects in the real-world imagery based on the accurate location coordinates of the imaging device and the rendered computed depth map, the virtual. objects occluded by real-world features in the real-world imagery based on positions of the real-world features relative to the virtual objects.

* * * * *

UNITED STATES PATENT AND TRADEMARK OFFICE
CERTIFICATE OF CORRECTION

| | | |
|---|---|---|
| PATENT NO. | : 8,633,970 B1 | Page 1 of 1 |
| APPLICATION NO. | : 13/599755 | |
| DATED | : January 21, 2014 | |
| INVENTOR(S) | : Mercay et al. | |

It is certified that error appears in the above-identified patent and that said Letters Patent is hereby corrected as shown below:

In the Claims

Column 12, line 45, Claim 4, please delete "," after the word "blending"

Column 13, line 31, Claim 9, after the word "information", please delete "based"

Column 13, line 53, Claim 12, after the word "claim", please delete "1" and insert --11--

Column 16, line 12, Claim 27, after the word "virtual", please delete "Objects" and insert --objects--

Column 16, line 14, Claim 27, please delete "." after the word "virtual"

Signed and Sealed this
Eighteenth Day of November, 2014

Michelle K. Lee
*Deputy Director of the United States Patent and Trademark Office*